(12) United States Patent
Liu et al.

(10) Patent No.: US 6,860,374 B2
(45) Date of Patent: Mar. 1, 2005

(54) APPARATUS AND METHOD FOR RATCHET ACTUATOR

(75) Inventors: Jintao Liu, Windsor (CA); Alfred Stadlbauer, Puchenau (AT)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/425,413

(22) Filed: Apr. 29, 2003

(65) Prior Publication Data

US 2003/0196868 A1 Oct. 23, 2003

Related U.S. Application Data

(63) Continuation of application No. 09/970,268, filed on Oct. 3, 2001, now Pat. No. 6,691,851.

(51) Int. Cl.[7] .............................. B60N 2/16; B60N 2/22
(52) U.S. Cl. ........................ 192/223.2; 192/15; 192/19
(58) Field of Search ............................. 192/15, 17 R, 192/19, 223.1, 223.2, 223; 74/143, 535, 530; 297/344.1, 344.11; 248/429

(56) References Cited

U.S. PATENT DOCUMENTS

| 823,971 | A | 6/1906 | Remondy | |
|---|---|---|---|---|
| 3,631,951 | A | 1/1972 | Quenneville | ................ 192/8 C |
| 3,726,370 | A | 4/1973 | Hubbard, Jr. | ................ 192/8 C |
| 3,759,358 | A | 9/1973 | Quenneville | ................ 192/8 C |
| 3,796,292 | A | 3/1974 | Harrison | ..................... 192/8 C |

(List continued on next page.)

FOREIGN PATENT DOCUMENTS

| DE | 29 47 472 | 8/1980 | ............ B60N/1/00 |
|---|---|---|---|
| EP | 0 006 840 B1 | 2/1982 | ............ A47C/23/00 |
| EP | 0 322 535 A1 | 7/1989 | ............ A47C/7/46 |
| EP | 0 751 030 A1 | 1/1997 | ............ B60N/2/22 |
| EP | 0 751 032 B2 | 1/2001 | ............ B60N/2/22 |
| EP | 0 751 031 B1 | 9/2001 | ............ B60N/2/22 |
| EP | 0 885 164 B1 | 7/2002 | ............ B65H/75/30 |
| FR | 2 809 999 A1 | 12/2001 | ............ B60N/2/16 |
| WO | WO 99/05000 | 2/1999 | ............ B60N/2/06 |
| WO | WO 02/11584 A1 | 2/2002 | ............ A47C/8/46 |

OTHER PUBLICATIONS

"ratchet", Dictionary.com, The American Heritage® Dictionary of the English Language, Fourth Edition Copyright © 2000 by Houghton Mifflin Company.*

International Search Report for PCT/US02/31766, Mailed Jan. 17, 2003.

*Primary Examiner*—Saul Rodriguez
(74) *Attorney, Agent, or Firm*—Husch & Eppenberger, LLC; Grant D. Kang; Robert C. Haldiman (57) ABSTRACT

A ratcheting, locking actuator for selectively positioning ergonomic devices is disclosed. The actuator has an overrunning, locking clutch in a housing, a lever, a hanging ratchet and a pulley for anchoring a traction element. The pulley is driven by a gear which is driven by the one of two ratchet pawls in either of two selectable directions. The drive direction is controlled by a lever to which a ratchet post is attached. Engagement and disengagement of the ratchet pawls with the drive gear is controlled by steps on the housing. The actuator is especially useful for controlling traction elements such as bowden cables for ergonomic devices such as lumbar supports.

10 Claims, 11 Drawing Sheets

U.S. PATENT DOCUMENTS

| | | | |
|---|---|---|---|
| 3,876,184 A | 4/1975 | Eudy | 254/150 R |
| 4,014,422 A | 3/1977 | Morishita | 192/67 R |
| 4,316,631 A | 2/1982 | Lenz et al. | 297/284 |
| 4,354,709 A | 10/1982 | Schuster | 297/284 |
| 4,494,709 A | 1/1985 | Takada | 242/107.6 |
| 4,561,606 A | 12/1985 | Sakakibara et al. | 242/107 |
| 4,614,257 A | 9/1986 | Harada et al. | 192/8 C |
| 4,778,138 A | 10/1988 | Yamada | 248/421 |
| 4,786,110 A | 11/1988 | Mahling et al. | 297/362 |
| 4,817,771 A | 4/1989 | Iten | 192/16 |
| 5,010,780 A | 4/1991 | Hatfield | 74/501.5 R |
| 5,050,930 A | 9/1991 | Schuster et al. | 257/284 |
| 5,080,434 A | 1/1992 | Locher | 297/301 |
| 5,186,412 A | 2/1993 | Park | 242/245 |
| 5,197,780 A | 3/1993 | Coughlin | 297/284.7 |
| 5,211,368 A | 5/1993 | Kitamura | 248/292.1 |
| 5,217,278 A | 6/1993 | Harrison et al. | 297/284.7 |
| 5,248,017 A | 9/1993 | Schwarzbich | 192/8 R |
| 5,382,076 A | 1/1995 | Scheck et al. | 297/354.12 |
| 5,397,164 A | 3/1995 | Schuster et al. | 297/284.1 |
| 5,449,219 A | 9/1995 | Hay et al. | 297/284.4 |
| 5,522,488 A | 6/1996 | Schwarzbich | 192/8 R |
| 5,567,010 A | 10/1996 | Sparks | 297/284.4 |
| 5,567,011 A | 10/1996 | Sessini | 297/284.7 |
| 5,593,210 A | 1/1997 | Schwarzbich | 297/361.1 |
| 5,609,394 A | 3/1997 | Ligon, Sr. et al. | 297/284.4 |
| 5,638,722 A | 6/1997 | Klingler | 74/502.4 |
| 5,651,584 A | 7/1997 | Chenot et al. | 297/284.4 |
| 5,681,005 A | 10/1997 | Ligon, Sr. et al. | 242/394.1 |
| 5,704,687 A | 1/1998 | Klingler | 297/284.4 |
| 5,769,491 A | 6/1998 | Schwarzbich | 297/284.4 |
| 5,794,479 A | 8/1998 | Schwarzbich | 74/143 |
| 5,842,659 A | 12/1998 | Ligon, Sr. et al. | 242/394.1 |
| 5,865,285 A | 2/1999 | Minkenberg et al. | 192/15 |
| 6,045,185 A | 4/2000 | Ligon, Sr. et al. | 297/284.4 |
| 6,050,641 A | 4/2000 | Benson | 297/284.4 |
| 6,158,300 A | 12/2000 | Klingler | 74/526 |
| 6,178,838 B1 | 1/2001 | Schwarzbich | 74/143 |
| 6,227,617 B1 | 5/2001 | von Möller | 297/284.4 |
| 6,230,867 B1 | 5/2001 | Schwarzbich | 192/223.2 |
| 6,238,123 B1 | 5/2001 | Schwarzbich | 403/45 |
| 6,253,894 B1 * | 7/2001 | Schumann et al. | 192/15 |
| 6,283,886 B1 * | 9/2001 | Schumann | 475/162 |
| 6,345,549 B1 | 2/2002 | Lance | 74/500.5 |
| 6,543,598 B1 * | 4/2003 | Schumann | 192/223 |
| 6,637,575 B2 * | 10/2003 | Liu et al. | 192/223.2 |
| 2002/0043849 A1 | 4/2002 | Denis | 297/344.1 |
| 2003/0062749 A1 * | 4/2003 | Liu et al. | 297/284.4 |

* cited by examiner

APPARATUS AND METHOD FOR RATCHET ACTUATOR

CROSS-REFERENCE TO RELATED APPLICATIONS

This application is a continuation of Application No. 09/970,268, filed Oct. 3, 2001, now Pat. No. 6,691,851, issued Feb. 17, 2004.

STATEMENT REGARDING FEDERALLY SPONSORED RESEARCH OR DEVELOPMENT

None

BACKGROUND OF THE INVENTION

1. Field of the Invention

The present invention is in the field of mechanical actuators, particularly tension or traction device actuators, especially as used in automotive or furniture ergonomic mechanisms such as lumbar supports.

2. Prior Art

Ergonomic mechanisms such as lumbar supports are typically adjustable by mechanical means which may be activated and controlled at certain expense by motors, and at a lesser expense by levers, handwheels and the like. There is a continuing need for simplicity, durability and cost control in this area.

Ergonomic mechanisms are commonly designed to retain particular settings chosen by a repeat user for his or her individual comfort. Retaining an adjustment is often achieved by keeping a device like a lumbar support under pressure or tension, as by a traction cable. Settings need to be maintained through loading and unloading cycles, requiring brakes or locks for holding the settings. Serial adjustment must remain possible, requiring releases, overrides or clutches. In high volume markets such as automobiles or furniture, reducing costs and simplifying assembly of these multiple components are constant needs.

Simple levers are desirable adjustment devices, especially for automobiles. However, once a user selects a position for a device such as a lumbar support, the corresponding lever position frequently protrudes at an inconvenient angle. In automobiles, this can be particularly problematic in that clothing, seat belts and the like are easily caught on a lever that protrudes from the seat back where such levers are usually mounted. There is a need for a lever that can actuate an ergonomic mechanism like a lumbar support, maintain the selected position of it, and keep the lever in a home position where it is minimally intrusive.

SUMMARY OF THE INVENTION

The present invention is a ratcheting, locking clutch actuator, particularly for selectively positionable ergonomic devices like lumbar supports. The present invention uses a novel hanging scissors ratchet and lever to drive a geared shaft through a pre-selected number of degrees and thereafter return the lever to a home position.

Drive direction is selectable by a pair of facing ratchet pawls. Lever homing is by a biasing spring. The present invention combines the scissors ratchet and homing lever with a releasable, overrunning clutch and lock assembly.

A housing assembly offsets the scissors ratchet from a drive shaft. The lever shaft is preferably co-axial with a drive gear, and also with a retaining ring and eccentric hub which comprise a clutch. The clutch hub is engaged with a pulley in a pulley housing, again in a preferably co-axial configuration. The pulley is tractively engaged with one end of a tensioning cable. The other end of the cable is operatively engaged with a ergonomic device, such as a lumbar support.

Turning the lever one or more times through a preconfigured arc advances the pulley one direction to draw the cable into a selected position. The locking hub retains the pulley cable at the selected position while the ratchet/spring assembly homes the lever. Turning the lever the opposite direction reverses the drive gear and shaft, releasing the locking clutch hub and paying out the cable via the counter rotating pulley until a second selected position is reached, whereupon the second position is again locked by the clutch hub and the lever again homed by the biasing spring.

Further features and advantages of the present invention, as well as the structure and operation of various embodiments of the present invention, are described in detail below with reference to the accompanying drawings.

DETAILED DESCRIPTION OF THE PRESENT INVENTION

Ergonomic Mechanism Operation

Figure 1:
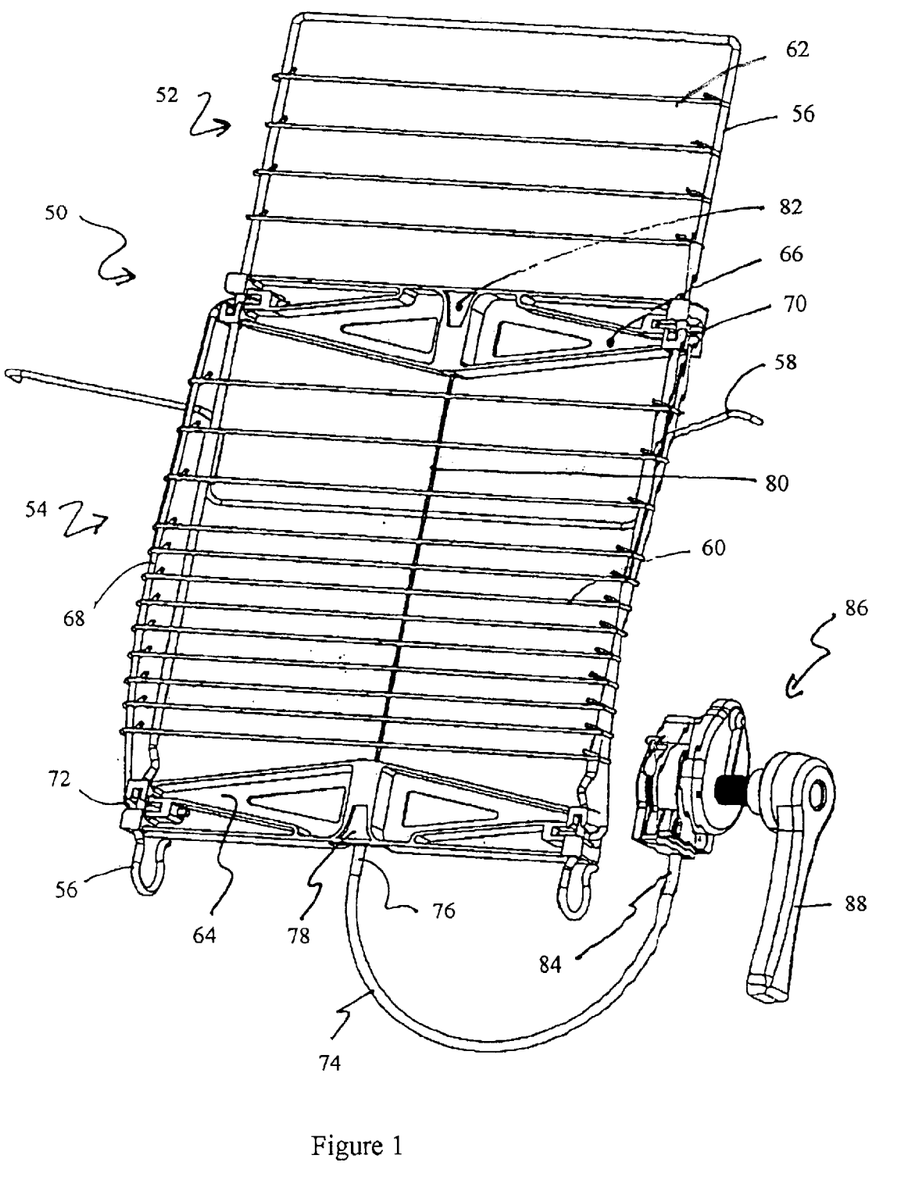
FIG. 1 is a perspective view of a typical ergonomic device—a lumbar support—with the ratchet actuator of the present invention.

Referring to the figures where like reference numbers indicate like elements, FIG. 1 is a perspective view of a typical ergonomic device—a lumbar support—with the ratchet actuator of the present invention installed. Lumbar support, 50, has a fixed portion, 52, and an arching portion, 54. Guide rails, 56, are mounted to a seat frame (not shown) with mounting mechanisms, 58. A plurality of lateral elements, 60, span the archable portion of the lumbar support and, in the pictured example, lateral elements, 62, also traverse the fixed portion, 52, of the lumbar support.

Also disposed on guide rails, 56, are two brackets comprised of a fixed lower bracket, 64, and sliding upper bracket, 66. Two archable pressure surfaces, 68, in this case metal rods, run generally vertically and, when flat, are generally parallel to guide rails, 56. The archable pressure rods, 68, are pivotally mounted to the upper bracket at pivot mounts, 70, and pivotally mounted to the lower bracket, 64, at pivot mounts, 72. When upper bracket, 66, is made to slide downwards towards lower bracket, 64, pressure rods, 68, are made to bow, which arches lateral elements, 60, towards a seat occupant creating an arched lumbar supporting surface.

One of the most common mechanisms used to move mounting brackets 64 and 66 towards one another is a traction cable. Particularly common is a bowden cable, as depicted in FIG. 1. The bowden cable is comprised of an outer, flexible sleeve, 74, which retains and directs a wire, 80, within the sleeve which can slide co-axially in and out of the sleeve. In FIG. 1, the bowden cable sleeve, 74, has an end, 76, mounted to the lower bracket, 64, at a bowden cable mounting bracket, 78. Bowden cable mount, 78, acts as a stop to bowden cable sleeve end, 76, but allows sliding passage therethrough of bowden cable wire, 80. Bowden cable wire, 80, proceeds vertically upwards to where it is mounted to upper sliding bracket, 66, at a traction cable mounting point, 82. An opposite bowden cable sleeve end, 84, is mounted at the actuator, 86. The actuator applies traction to the bowden cable wire, 80, when a seat occupant rotates the lever, 88. The lever may alternatively be a handwheel or other device giving mechanical advantage. This tractive force draws the bowden cable wire, 80, through the bowden cable sleeve, 74, causing the bowden cable wire, 80, to pull the sliding upper bracket, 66, towards the first bowden cable sleeve end, 76, which in this case pulls the sliding upper bracket, 66, downwards towards the lower bracket, 64, along guide rails, 56. As described above, tractive movement of the upper mount, 66, towards the lower mount, 64, bows the pressure rods, 68, outwards in a lumbar supporting arch.

Pressure rods, 68, are biased towards their flat position. Accordingly, when there is no tension on bowden cable wire, 80, the arching pressure surface, 54, of lumbar support, 50, returns to a rest position that is generally flat.

Hence, it is apparent that the most rudimentary function of any actuator is to draw the bowden cable wire, 80, through the bowden cable sleeve, 74. If an alternative traction device were elected as a design choice, the most rudimentary function of an actuator would remain to draw the tractive element, whether it is a rod, cable, or otherwise, in a direction applying tractive force to actuate the ergonomic mechanism. The present invention may be applied to any such tractive devices. In another alternative design choice, compressive pressure may be used to bow an archable surface. The present invention may likewise be used to drive such a compressive mechanism.

The Ratchet Actuator

Figure 2:
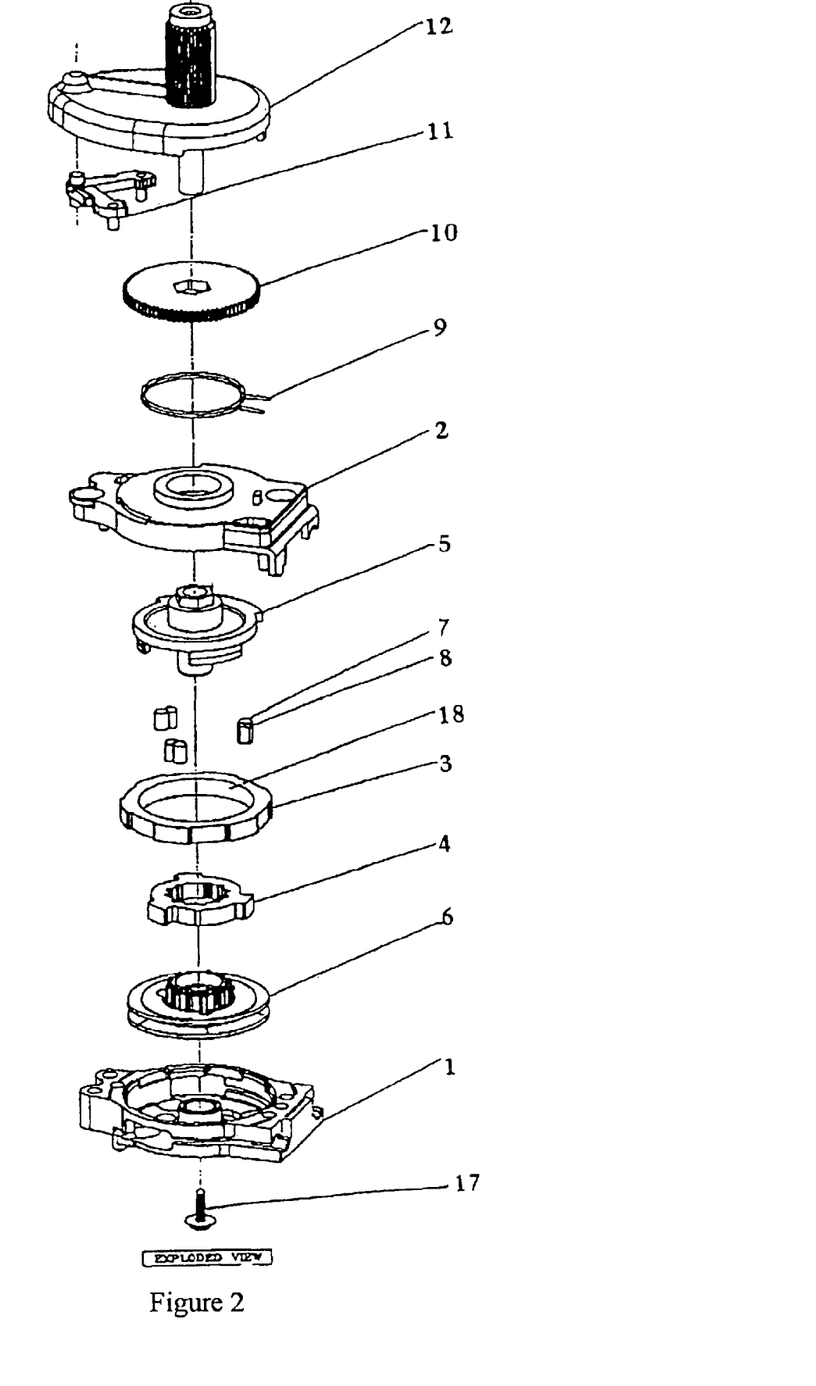
FIG. 2 is an exploded view of the ratchet actuator of the present invention.
Figure 3:
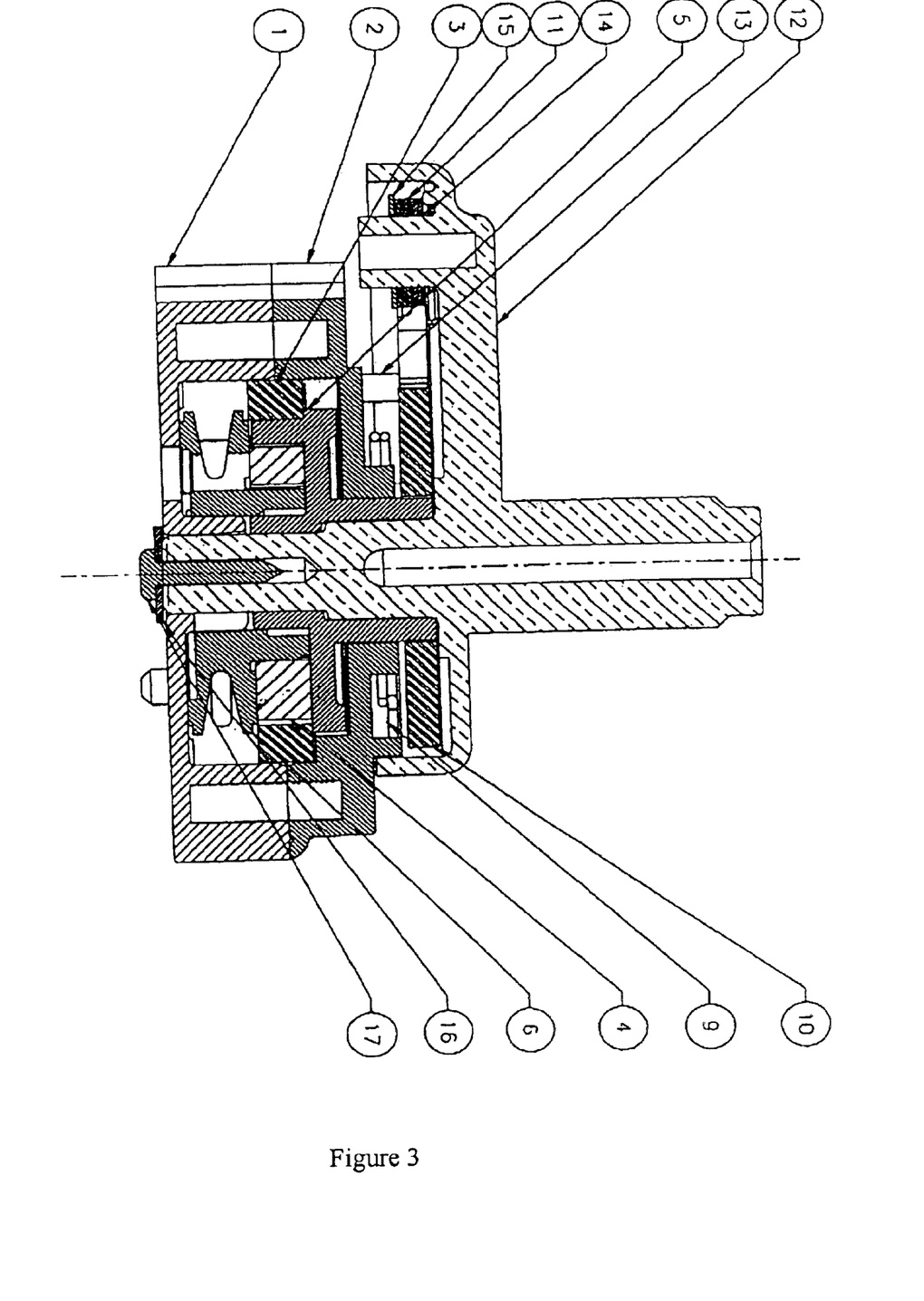
FIG. 3 is a bisected side view of the ratchet actuator of the present invention.

FIG. 2 is an exploded view of the preferred embodiment of the ratchet actuator, 86, of the present invention. FIG. 3 is a bisected side view of the ratchet actuator of FIG. 2 showing all elements except the scissors ratchet, 11, and the lock rollers and springs, 7 and 8. In the depicted preferred embodiment of the present invention, all the elements shown in FIG. 3 are co-axial.

Base housing, 1, cradles in it pulley, 6, eccentric hub, 4, and ring, 3. Ring, 3, has an inner surface, 18. Eccentric hub, 4, has three bosses whose outer edge are in rotating, sliding communication with the inner surface, 18, of ring, 3. The bosses define between them three spaces. The edge of eccentric hub, 4, in these spaces is a cam. When assembled with ring, 3, the spaces between the cam edge of the eccentric hub and the inner surface, 18, of ring 3 form a constricting channel. In assembly, three pairs of steel rollers, 7, and rubber grommets, 8, are deposed in each of the three spaces between eccentric hub, 4, and ring, 3.

Onto the top of this assembly is placed disk, 5, with downward projecting fingers that also are interposed into the three spaces between eccentric hub, 4, and ring, 3. This assembly of hub, 4, ring, 3, rollers, 7, grommets, 8, and disk, 5, comprise the locking clutch, which is to be described in greater detail below.

The locking clutch assembly is encapsulated by closure of top housing, 2, with base housing, 1. On top of top housing, 2, is disposed a biasing spring, 9, then a drive gear, 10, and lever arm housing, 12. Lever arm housing, 12, has a toothed shaft onto which the lever arm, 88, (not shown) is fixed. Hanging from the lever arm housing, 12, by a post (not shown) is a scissor ratchet, 11. The center of drive gear 10 is a hexagonal nut for receiving installation of a hexagonal bolt extension of a drive disk described below.

Screw, 17, or a bolt, rivet or other fixator holds base housing, 1, together with a lower shaft extension of lever arm housing, 12.

Figure 4:
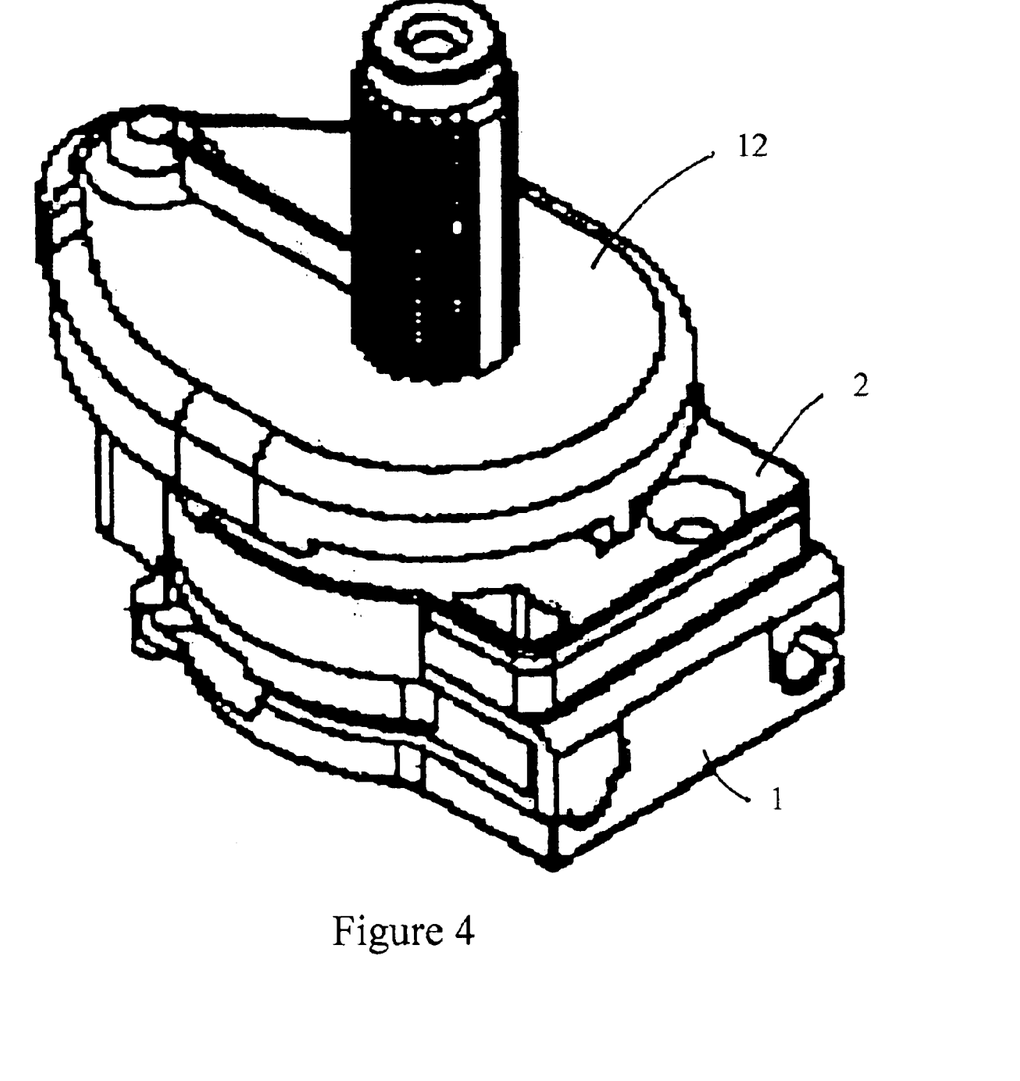
FIG. 4 is an isometric view of the assembled ratchet actuator of the present invention, without the lever arm or cable installed.

FIG. 4 is an isometric view of the ratchet actuator, 86, of FIG. 2 assembled without the lever arm, 88, or bowden cable, 74, installed.

Figure 5:
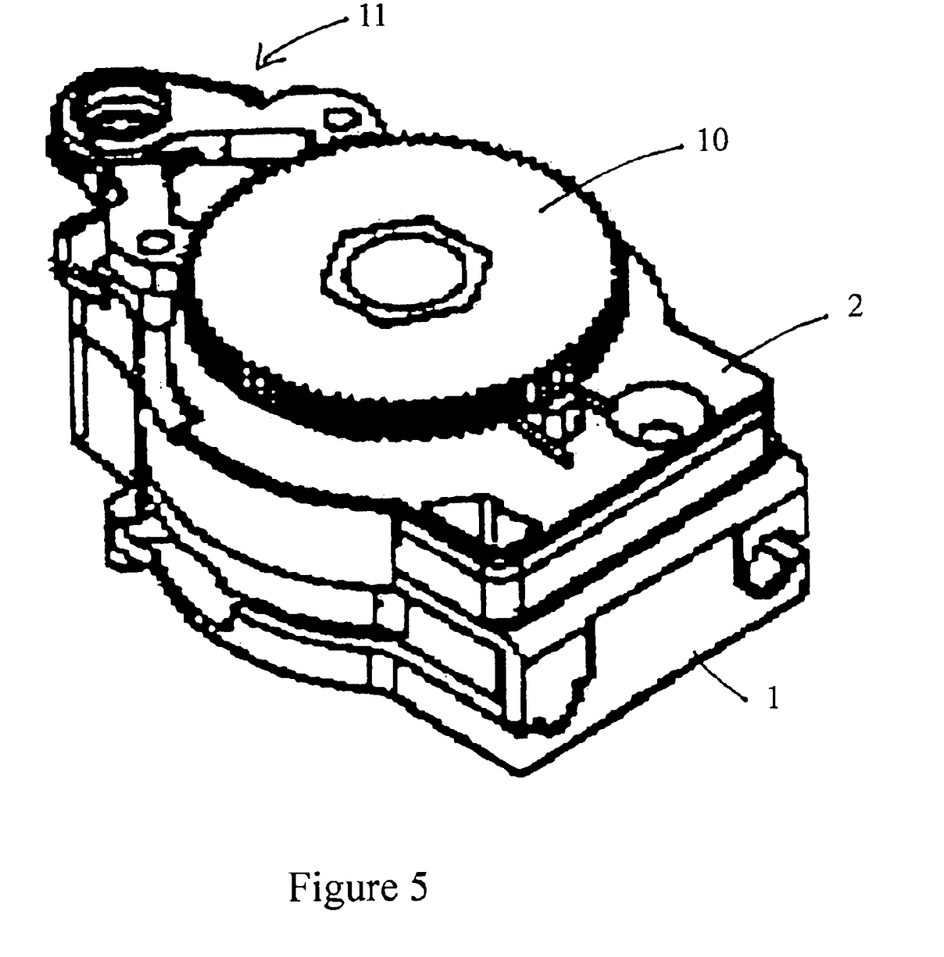
FIG. 5 is an isometric view of the ratchet actuator of the present invention with the lever arm housing removed in order to reveal the disposition of a scissors ratchet and its engagement with a drive gear.

FIG. 5 is an isometric view of the ratchet actuator, 86, with the lever arm housing, 12, removed in order to reveal the disposition of the scissors ratchet, 11 and its engagement with drive gear, 10.

Figure 6:
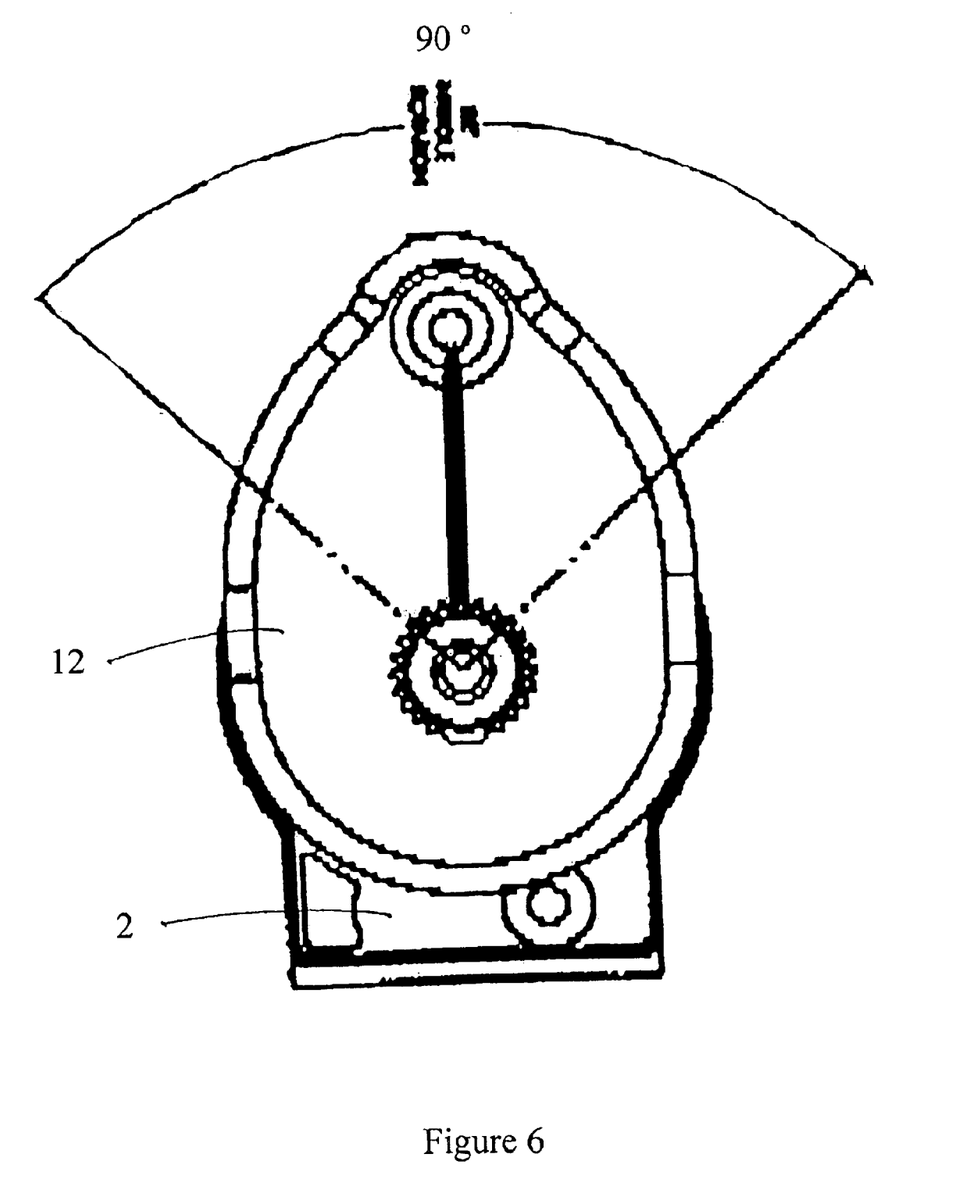
FIG. 6 is a top view of the ratchet actuator of the present invention without the lever arm installed.

FIG. 6 is a top view of the ratchet actuator, 86, without the lever arm, 88, installed. FIG. 6 discloses the pre-configured degree of arc through which the lever arm may be turned by a seat occupant. In a preferred embodiment, the lever, 88, may be turned 45° in either direction.

Figure 7:
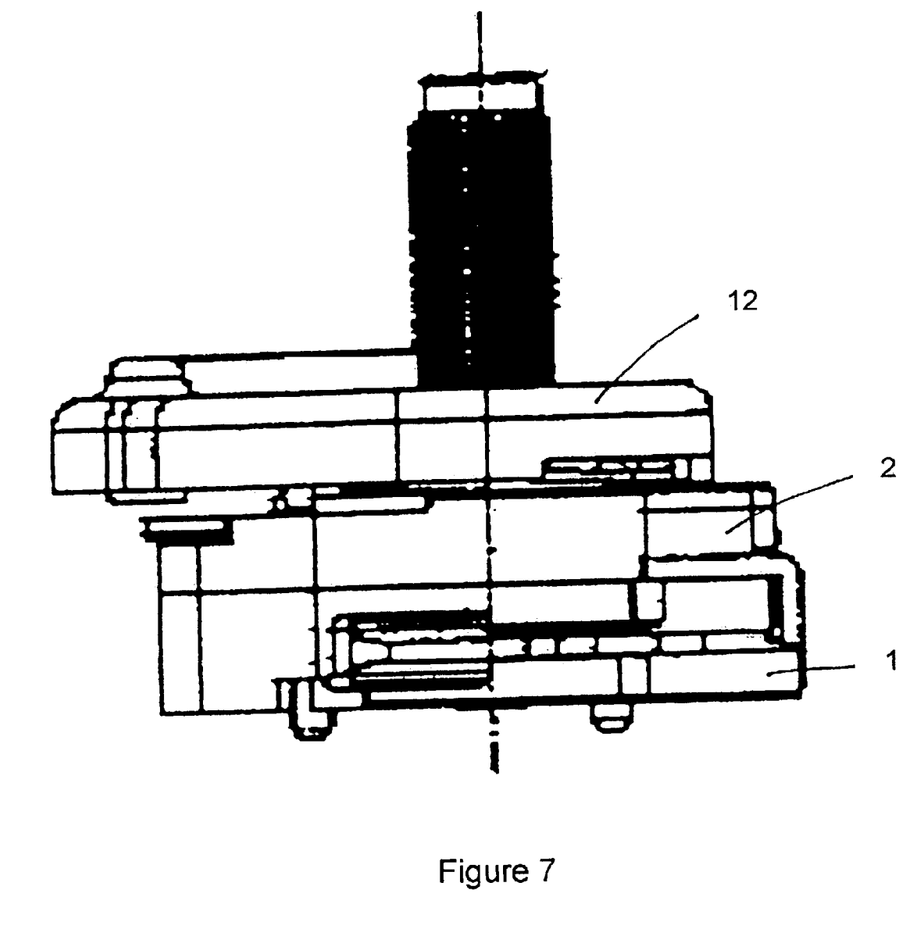
FIG. 7 is a side view of the assembled ratchet actuator of the present invention.

FIG. 7 is a side view of the ratchet actuator, 86, as assembled.

Figure 8:
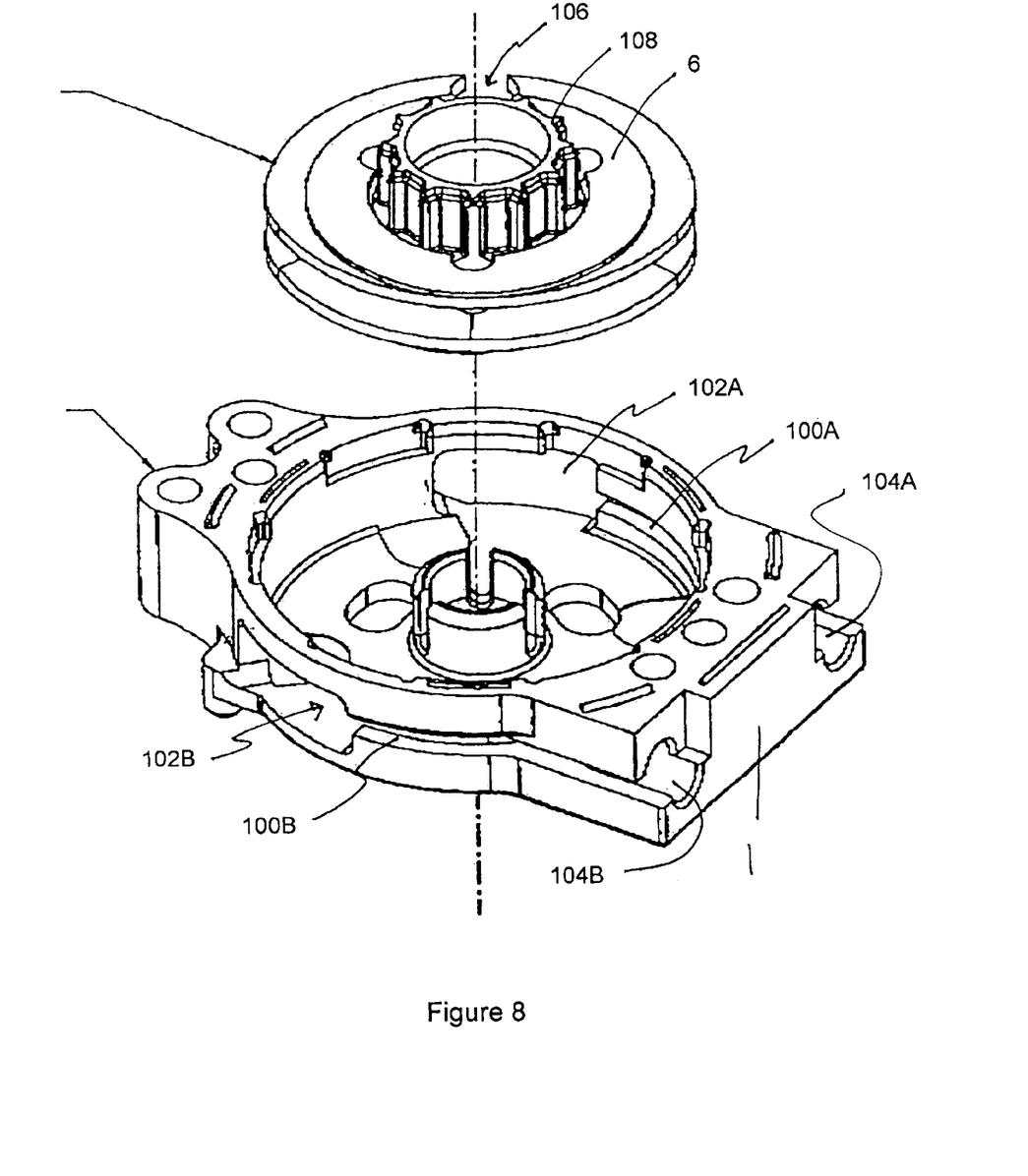
FIG. 8 is a close up of the base housing and pulley.

FIG. 8 is a close up of the base housing, 1, and pulley, 6. The bowden cable (not shown) is assembled with the pulley, 6, and base housing, 1 as follows. Either of slots, 100, allow insertion of a bowden cable wire, 80 (or other traction wire) into the base housing, 1. Wider portions, 102, of slots 100, allow insertion of a cable wire end stop. Exit holes, 104 serve as both passage ways for travel of the bowden cable wires, 80, and as stops for bowden cable sleeve ends, 84. The corresponding opposite slots and exits, 100, 102 and 104, on opposite sides of base housing, 1 allow for reverse installation of a bowden cable wire, so that the ratchet actuator may be installed for actuating either clockwise traction or counterclockwise traction in order to accommodate seat design flexibility such as would be useful in installing mirror image actuators on outboard sides of both a driver's and a passenger's side seat.

Pulley, 6, has a notch, 106, for receiving installation of the bowden cable wire end stop. The bowden cable wire, 80, would then be wrapped partially around pulley, 6, and lead out through either exit hole, 104. In this configuration, rotation of pulley, 106, wraps the bowden cable, 80, further around pulley, 106, which effects a shortening of the bowden cable wire, 80, at the opposite end of the bowden cable, 80. This shortening also draws the bowden cable wire, 80, through the bowden cable sleeve, 74, applying the desired traction to the ergonomic mechanism to which the other end of the bowden cable wire, 80, and bowden cable sleeve, 74, are attached.

Pulley, 106, further has a cylindrical extension, 108, with notches corresponding to a central hole in locking hub, 4, for a rotationally fixed assembly of pulley, 6, with hub, 4.

Alternatively and equivalently, rotational force transferred by the ratchet and clutch combination of the present invention could be converted into tractive force by mechanisms besides a pulley and cable, as, for example, a rack and pinion or a cam and push rod.

Referring back to FIGS. 1 and 2, in operation a seat occupant turns lever arm, 88, which rotates lever arm housing, 12. Rotation of lever arm housing, 12, moves scissors ratchet, 11, along its arcuate path, causing its ratchet teeth to engage with drive gear, 10. The hexagonal hole in drive gear, 10, engages with the hexagonal nut extension of disk, 5, thereby driving disk, 5, in the same rotational direction as drive gear, 10. The downwardly disposed fingers of disk, 5, engage the bosses of eccentric hub, 4, also driving it in the same rotational direction as disk, 5, and drive gear, 10. Eccentric hub, 4, through notched extension, 108, of pulley, 6, drives pulley, 6, in the same rotational direction. Rotation of pulley, 6, either draws in or plays out bowden cable wire, 80, which is partially wrapped around pulley, 6, through one of the holes, 104, of base housing, 1. Accordingly, tension on bowden cable wire, 80, is increased or decreased causing a corresponding narrowing or widening of the space between mounting brackets, 66 and 64, on lumbar support, 50, which in turn increases or decreases an arch in pressure rods, 68.

The Scissors Ratchet

Figure 9:
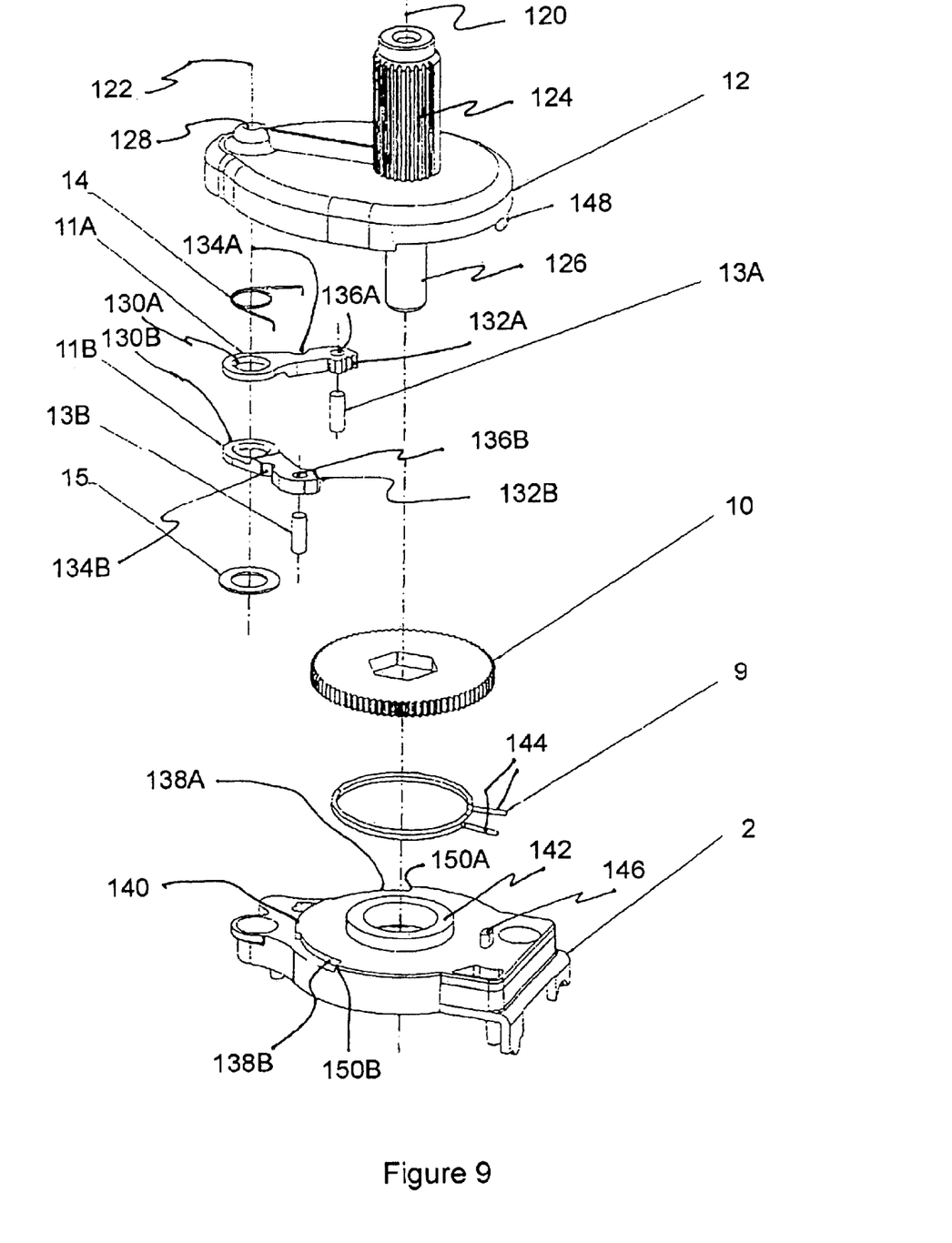
FIG. 9 is an exploded view of the scissors ratchet of the present invention.

FIG. 9 is an exploded view of the scissors ratchet, 11, of FIG. 2. Lever arm housing, 12, has a drive axis, 120, and a scissors ratchet post axis, 122, which is offset from the drive axis, 120. The lever arm housing, 12, has a toothed, drive axis upper shaft, 124, which is designed to receive fixation of the lever arm, 88, (not shown). Lever arm housing, 12, also has a drive axis lower shaft, 126, which extends through all the co-axial drive axis elements of the ratchet actuator, 86, and fixes them together by means of a screw, 17, and washer, 16. Disposed on drive axis, 120, and between the lever arm housing, 12, and the upper housing, 2, are drive gear, 10, and homing spring, 9. Alternatively, other biasing mechanisms may be used to bias the lever to a neutral position.

A post (not shown) is disposed within a hole, 128, in lever arm housing, 12, along ratchet axis, 122. On this post are disposed the various components of the scissors ratchet, 11, all of which are held in place by a toothed lockwasher, 15. The post does not contact the drive gear, 20, top housing, 2, or other components. This hanging disposition allows the post to swing freely through an arc.

The scissors ratchet, 11, is comprised of two ratchet pawls, 11A and 11B, two pins, 13A and 13B, and a spring, 14. Ratchet pawls, 11A and 11B, are mirror images of each other in the sense that their teeth face in opposite directions. Each pawl, 11A and 11B, has a post end, 130A and 130B respectively, with a hole, for installation on the ratchet post. The pawl post ends, 130A and 130B, are stepped in a complementary fashion such that the pawls will be disposed in the same plane. Also in the same plane is drive gear, 10. Accordingly, ratchet pawl teeth, 132A and 132B, are disposed to engage the teeth of drive gear, 10. The spring, 14, also disposed on ratchet post, biases ratchet pawl teeth, 132A and 132B, into engagement with the teeth of drive gear, 10. The spring, 14, has ends which engage with notches, 134A and 134B, in each of ratchet pawls, 11A and 11B, respectively.

In order that the scissors ratchet, 11, selectively rotate drive gear, 10, in either a clockwise or counterclockwise direction, a mechanism is incorporated in the present invention to selectively engage one and disengage the other of the ratchet pawls, 11A and 11B. This mechanism is comprised of the engagement of ratchet pawl pins, 13A and 13B, with corresponding steps on top housing, 2. Each pin, 13A and 13B, is inserted into a corresponding hole, 136A or 136B, in the toothed end of each corresponding ratchet pawl, 11A and 11B. Pins, 13A and 13B, are inserted into holes, 136A and 136B, and extend in a downward direction. Pins, 13A and 13B, are longer than drive gear, 10 is thick. Accordingly, pins, 13A and 13B, extend downwards into engagement with steps on top housing, 2. Top housing, 2 has two lower steps, 138A and 138B, and one upper step, 140. The biasing action of spring, 14, not only maintains engagement of one of the ratchet pawl toothed ends, 132A or 132B, with the teeth of drive gear, 10, but also maintains a sliding contact between pins 13A and 13B, and the steps, 138 and 140, of top housing, 2. The arcuate distance of steps, 138 and 140, are pre-configured such that when rotation of lever arm housing, 12, moves the scissors ratchet assembly either clockwise or counterclockwise in order to bring tooth ratchet pawl ends, 132A or 132B, into driving engagement with the teeth of drive gear, 10, the arcuate travel of lever arm housing ratchet axis, 122, slides the pin, 13, of the opposite scissors ratchet pawl, 11, along the lower step, 138, until the pin meets, engages, and is driven radially outward by the upper step, 140. For example, if the seat occupant pushes the lever in a direction that is clockwise looking down on the assembly in FIG. 9, ratchet pawl, 11A, will have its teeth, 132A, brought into engagement with the teeth of drive gear, 10. At the same time engaging ratchet pawl, 11A, will have its pin, 13A, engaged with lower step, 138A, which is dimensioned to allow the engagement of the teeth. This engagement is maintained by the biasing action of spring, 14. This same degree of rotation will slide the opposing ratchet pawl pin, 13B, along the opposing lower step, 138B, until it engages upper step, 140. Upper step, 140, is at a radius from drive axis, 120, that is greater than the radius of lower steps, 138. Accordingly, upper step, 140, will bias pin, 13B, and the ratchet pawl, 11B, away from the drive axis, 120, and therefore out of engagement with the teeth of drive gear, 10.

One of the advantages of the present invention is that the lever, 88, returns to an unobtrusive "home" position after driving the drive gear, 10. The lever arm, 88, is "homed" by returning the lever arm housing, 12, to its original position. Through its locked fixation with lever arm housing shaft, 124, the lever, 88, and lever arm housing, 12, move in unison. Although the ratchet actuator of the present invention can be installed in any fashion, it is conceived that the home position of the lever arm, 88, will be conveniently disposed, most likely parallel to the back of a seat.

The lever arm housing, 12, is driven to its home position after a drive rotation by homing spring, 9. Homing spring, 9, is deposed on top of top housing, 2, and around top housing circular extension, 142. Symmetrical pressure arms, 144, of spring, 9, are disposed on either side of top housing boss, 146, and also on either side of lever arm housing boss, 148. When the lever arm, 88, and lever arm housing, 12, are in the home position, bosses, 146 and 148, are aligned along the same radius from drive axis, 120. In this position, spring, 9, is at rest and without tension. When the seat user rotates the lever arm, 88, and lever arm housing, 12, the lever arm housing boss, 148, is rotated out of its radial alignment with top housing boss, 146, and brought into contact with one or the other of pressure arms, 144 of spring, 9. The rotation of the lever arm housing, 12, puts spring, 9, under dynamic tension. After the seat occupant has taken the lever arm housing, 12, through its desired arc and releases pressure on lever arm, 88, the spring, 9, is free to apply its pressure to lever arm housing boss, 148, in order to push it back into alignment with top housing boss, 146. In the process, rotating lever arm housing, 12, and lever arm, 88, are brought back into the home position.

Top view FIG. 6 illustrates that the preferred embodiment of the present invention is pre-configured to allow lever arm, 88, to rotate 45 degrees in either direction. This corresponds to 8 millimeters of arcuate rotation of the pulley, 6, at the radius at which the bowden cable, 80, is seated in the preferred embodiment. The total travel distance of the bowden cable wire, 80, is limited to 32 millimeters. Accordingly, to move the bowden cable, 80, and lumbar support the full 32 millimeters, four full 45 degree rotations of the lever arm are required. The 45 degree limitation is created by stopping pins, 13A or 13B, at a travel end stop of the top housing lower steps, 138, at stop, 150.

The Locking Hub Clutch

Figure 10:
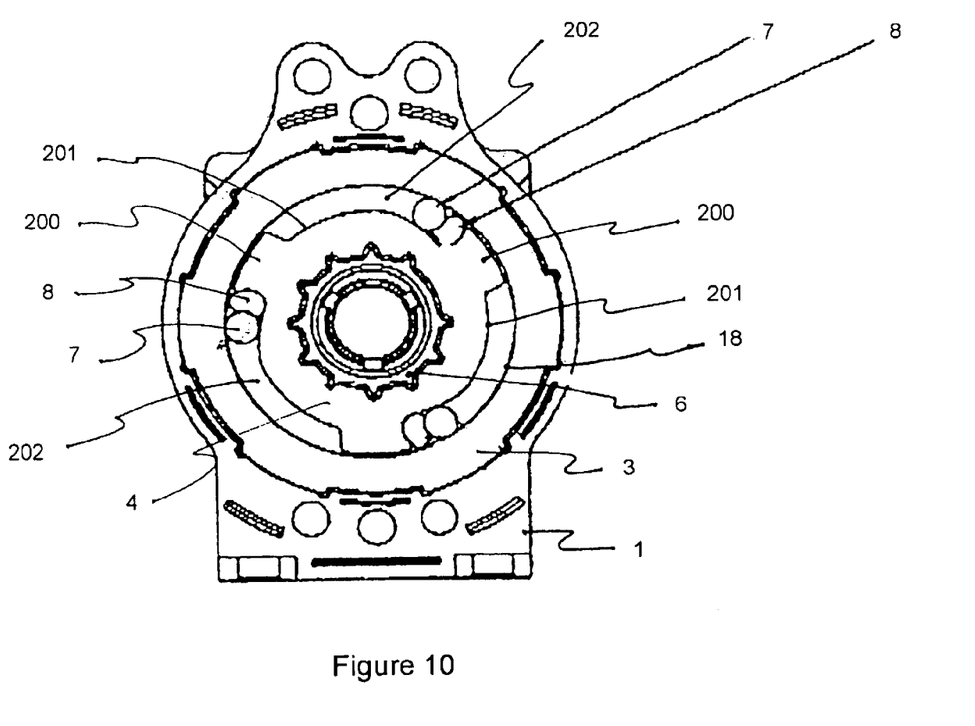
FIG. 10 is a top view of the locking clutch.

FIG. 10 is a top view of the assembled locking hub, overrunning clutch of the present invention. Top housing 2 and the components above it are removed. Visible in FIG. 10 are base housing, 1, hub, 4, steel rollers, 7, and rubber grommets, 8, as well as ring, 3. Pulley, 6, is below the locking hub, 4, and ring, 3. Only the top shaft extension of pulley, 6, is visible in FIG. 10, where its notched shaft, 108, interlocks with hub, 4.

Hub, 4 has, preferably, three bosses, 200. Any number of bosses are equivalent. The top of these bosses comprise an outer radius of hub, 4, which is disposed in rotating, sliding cooperation with the inner surface 18 of ring, 3. The edge, 201, of hub, 4, between bosses, 200, has a radial distance from the center of hub, 4, that is less than the outer or top surface of bosses, 200. As assembled, this inner surface of the edge, 201, of hub, 4, combines with the inner surface, 18, of ring, 3, to form spaces, 202. Disposed within these spaces are rubber grommets, 8, steel rollers, 7, and the downward protruding fingers, 204, of drive disk, 5, (See, FIG. 11). Hub edge, 201, is preferably arcuate, but may be generally flat, provided that the space it defines when assembled with ring, 3, is a constricting channel. Alternatively, the inner surface, 18, of ring, 3, may be eccentric. Another alternative is to eliminate ring, 3, altogether and use an inner surface of the housing to define the operative space.

In FIG. 10, spaces, 202 are narrower at their counter-clockwise extremity than they are at their clockwise extremity. Rubber grommet 8 is disposed at the extreme clockwise extremity of spaces, 202, where, preferably, it seats into a corresponding convexity in the side wall of bosses, 200. Proceeding along each space, 202, in a counter-clockwise direction, after rubber grommets, 8, steel rollers, 7, are disposed within spaces, 202, followed by the fingers, 204, of drive disk, 5. At its clockwise extremity, spaces, 202, are wider in the radial direction than the diameter of either steel rollers, 7, or rubber grommets, 8. Accordingly, hub, 4, can be freely moved in a counter-clockwise direction. However, space, 202, is radially narrower than the diameter of steel roller, 7, at the counter-clockwise extremity of each of spaces, 202. Accordingly, if hub, 4, is rotated in a clockwise direction, at some point between the clockwise extremity of space, 202, and the counter-clockwise extremity of space, 202, steel roller, 7, will become unable to fit between the inner surface edge, 201, of hub, 4, and the inner surface, 18, of ring, 3. At that point the steel roller will jam or "lock" and prevent further rotation of the hub, as well as all components attached to it, specifically pulley, 6, from proceeding any further in the clockwise direction. This is the locking feature of the hub, 4, and ring, 3, clutch assembly.

The point at which roller, 7, locks may be anywhere between grommet, 8, and drive disk finger, 204. Preferably, the locking point is close to the free or resting position of roller, 7, as depicted, in order that the clutch have a quick locking response and little "play."

Rubber grommets, 8, are disposed between bosses, 200, and steel rollers, 7. Their purpose is to act as a spring, biasing the steel rollers towards that point in the space, 202, at which they lock and prevent further rotation of hub, 4. This biasing prevents an undesirable back rotation of the assembly after the seat occupant releases the lever arm 88. Biasing the steel rollers, 7, to a point at or near where they lock also minimizes back rotation or "play" after a drive rotation of the lever arm, 88. This maximizes the useful portion of the drive arc of the lever arm, 88. Although rubber grommets are preferred as springs, coil, leaf or other types of springs would be equivalent alternatives. Rubber grommets, 8, and steel rollers, 7, are preferably cylindrical although other shapes, such as ball bearings, would be equivalent alternatives.

Figure 11:
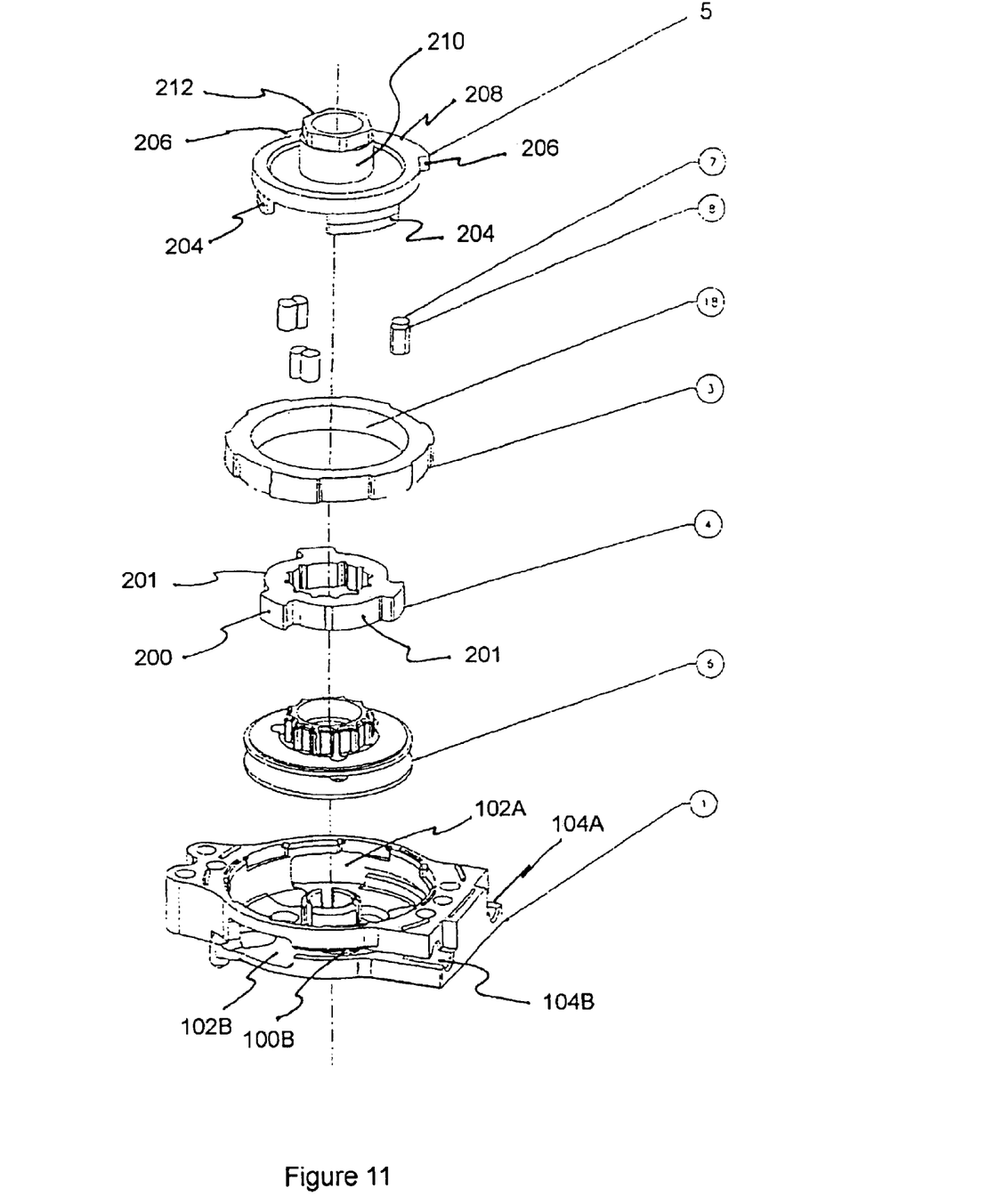
FIG. 11 is an exploded view of the locking clutch.

As mentioned, drive disc, 5, has fingers, 204, which also extend downward into space, 202. These fingers are disposed to abut bosses, 200, on the boss side opposite the rubber grommet. In operation, when the lever arm, 88, is rotated by a seat occupant in a counter-clockwise direction, the fingers, 204, of drive disc, 5, are brought into driving contact with the bosses, 200. This rotational force drives hub, 4, counter-clockwise, widening gap, 202, relative to steel roller, 7, and releasing it. Continued rotation of the drive disc, 5, pushes the hub, 4, and pulley, 6, through the pre-configured degrees of arcuate turning of the ratchet actuator, 86. Upon reaching the end of the rotating arc, preferably 45 degrees, pressure is released from fingers, 204, of drive disc, 5, when the seat occupant releases the lever arm, 88. The tension in the lumbar support biases the bowden cable wire, 80, and pulley, 6, to which it is attached in a reverse or clockwise direction. However, travel of the assembly in the reverse or clockwise direction is halted by the nearly immediate locking of the steel roller between the locking hub edge, 201, and inner surface, 18, of ring 3. In this fashion, the seat occupant may continue to ratchet the actuator until a desired degree of lumbar support arching is reached, and then release the lever arm. Then the lever is homed by spring, 9, while locking hub, 4, and pulley, 6, remain held in place by a steel rollers, 7.

The weight of the seat occupant biases the lumbar support towards the flat position and keeps the bowden cable wire, 80, under tension. In order for a seat occupant to flatten an arched lumbar support, the lever arm, 88, must be pushed in the opposite direction. This has the effect of rotating the fingers, 204, of drive disc, 5, in the clockwise direction where they come into contact with steel roller, 7, and force them out of their locked position, thereby allowing the pre-existing tension in bowden cable wire, 80, to cause an unwinding of pulley, 6, corresponding to a clockwise rotation in hub, 4, which is unimpeded by locking of the steel roller, 7, for so long as the fingers, 204, of drive disc, 5, maintain clockwise pressure on steel roller, 7.

With hub, 4, installed in this orientation, bowden cable wire, 80, attaches to pulley, 6, through hole and slot assembly, 100A, 102A and 104A. Reversing orientation is simply a matter of turning over hub, 4, during assembly, rotating notch, 106, in pulley, 6, and installing bowden cable wire, 80, through the opposite slot, 106B, 102B and 104B. In this second orientation, clockwise is the drive direction and counterclockwise is the locked direction.

The overall travel length of the bowden cable wire, 80, around pulley, 6, is limited by stops, 206, in step, 208 located along the edge of drive disc, 5, and corresponding to stops located on the underside of top housing, 2, (not visible).

Drive disc 5 has an upwards extending shaft, 210, which extends through a central drive axis hole in top housing, 2, in order to bring hexagonal faces, 212, of shaft, 210, into interlocking, driveable fixation with drive gear, 10.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A ratchet actuator comprising:
   a housing;
   a pulley in rotating communication with said housing, said pulley being adapted to draw a traction element;
   a one way locking clutch encapsulated by said housing and disposed to control rotation of said pulley such that said pulley locks against force exerted on said pulley by the traction element;
   a drive gear in rotationally driving communication with said pulley and said clutch;
   a ratchet in driving communication with said drive gear; and
   a lever in driving communication with said ratchet and rotationally fixed to said housing.

2. The ratchet actuator of claim 1 further comprising:
   a traction cable having one new anchored to said pulley such that rotation of said pulley draws said traction cable.

3. The ratchet actuator of claim 2 wherein said traction cable is a bowden cable.

4. The ratchet actuator of claim 1 further comprising:
   a traction cable having one end anchored to said pulley such that rotation of said pulley draws said traction cable, and a second end in operative communication with an ergonomic device.

5. The ratchet actuator of claim 4 wherein said ergonomic device is a lumbar support.

6. A ratchet actuator ergonomic device comprising:
   a housing;
   a pulley in rotating communication with said housing, said pulley being adapted o draw a tract ion clement;
   a locking clutch encapsulated by said housing and disposed to control rotation of said pulley;
   a drive gear in rotationally driving communication with said pulley and said clutch;
   a ratchet in driving communication with said drive gear;
   a lever in driving communication with said ratchet and rotationally fixed to said housing;
   a traction cable having a first end and a second end and said first end being fixed to said pulley; and
   an ergonomic device being fixed to said fraction cable second end and being actuatable by traction.

7. The ratchet actuated ergonomic device of claim 6 wherein said ergonomic device is a lumbar support.

8. A method of actuating an ergonomic device comprising:
   rotating a pulley via a lever ratchet and drive gear;
   controlling said rotating step by a clutch interaction step comprising:
      freewheeling of said rotation in a selected first rotational direction upon application of rotational force in said selected first direction;
      locking said pulley from rotating in a second rotational direction opposite said selected first direction upon removal of said rotational force in said first direction;
      selectively releasing said locking of said clutch upon application of rotational force in said second rotational direction;
   selectively applying rotational force in said direction or said second direction with a lever and ratchet by moving a first of two pawls into driving engagement with said drive gear in said first rotational direction while disengaging a second of said two pawls from said drive gear and by moving a second of said two pawls into driving engagement with said drive car in said second rotational direction while disengaging said first of said two pawls from said drive gear;
   returning said lever to a neutral position via a spring when rotational force is released;
   transferring said rotational force to tractive force via a cable end attached to said pulley; and
   actuating said ergonomic device via a second cable end attached to said ergonomic device.

9. A method of assembling an actuator comprising:
   enclosing in housing a pulley and an overrunning clutch such that said clutch mediates driving said pulley in a first rotational direction, locking said pulley in a selected position when a force in said first rotational direction is released, and releasing said locking when a second force in an opposite rotational direction is applied;
   connecting said pulley and said overrunning clutch to a toothed drive gear via a shall through said housing;
   engaging said toothed drive gear with a ratchet having two toothed pawls such that only one of said toothed pawls at a time meshes with said toothed drive gear; and
   maintaining said ratchet in said engagement via a lever having a fulcrum and a ratchet post, said ratchet post holding said pawls and said ratchet post being moveable along an are, said are being divided between a first section meshing a first of said two pawls with said drive gear in a direction corresponding to application of force in said first direction, and said arc having a second section meshing a second of said two pawls with said drive gear in a direction corresponding to said opposite direction.

10. A method of assembling an ergonomic device actuator comprising:
    enclosing in a housing a pulley and an overrunning clutch such that said clutch mediates driving said pulley in a first rotational direction, locking said pulley in a selected position when a force in said first rotational direction is released, and releasing said locking when a second force in an opposite rotational direction is applied;
    connecting said pulley and said overrunning clutch to a toothed drive gear via a shaft through said housing;
    engaging said toothed drive gear with a ratchet having two toothed pawls such that only one of said toothed pawls at time meshes with said toothed drive gear:
    maintaining said ratchet in said engagement via a lever having a fulcrum and a ratchet post, said ratchet post holding said pawls and said ratchet post being moveable along an arc, said are being divided between a first section meshing a first of said two pawls with said drive gear in a direction corresponding to application of force in said first direction, and said are having a second section meshing a second of said two pawls with said drive gear in a direction corresponding to said opposite direction;
    attaching a first end of a traction element to said pulley; and
    attaching a second end of said traction element to said ergonomic device.

* * * * *

UNITED STATES PATENT AND TRADEMARK OFFICE
CERTIFICATE OF CORRECTION

PATENT NO. : 6,860,374 B2
DATED : March 1, 2005
INVENTOR(S) : Liu et al.

It is certified that error appears in the above-identified patent and that said Letters Patent is hereby corrected as shown below:

Column 9,
Line 26, "having one new anchored" should read -- having one end anchored --
Line 37, "ratchet actuator ergonomic" should read -- ratchet actuated ergonomic --
Line 40, "o draw a tract ion clement" should read -- to draw a traction element --
Line 48, "second end and" should read -- second end, --
Line 50, "said fraction cable" should read -- said traction cable --

Column 10,
Line 1, "in said direction" should read -- in said first direction --
Line 7, "drive car in" should read -- drive gear in --
Line 25, "via a shall through" should read -- via a shaft through --
Line 33, "along an are, said are" should read -- along an arc, said arc --

Signed and Sealed this

Seventeenth Day of May, 2005

JON W. DUDAS
*Director of the United States Patent and Trademark Office*